United States Patent

Kisselmann et al.

[11] 3,712,262
[45] Jan. 23, 1973

[54] INDICATING INSTRUMENT WITH PIVOTABLE SCALES

[75] Inventors: Willy Kisselmann, Grunwald, near Munich; Fritz Rumpelein, Munich; Paul Kopf, Unterhaching, all of Germany

[73] Assignee: Agfa-Gevaert Aktiengesellschaft, Leverkusen, Germany

[22] Filed: April 10, 1970

[21] Appl. No.: 27,262

[30] Foreign Application Priority Data

April 21, 1969 Germany.....................P 19 20 185.5

[52] U.S. Cl.............116/129 R, 116/116, 324/154, 350/112, 353/14
[51] Int. Cl................................................G09f 9/00
[58] Field of Search...116/124, 124.1, 129, 135, 114, 116/124.4, 116; 177/178; 40/130, 137; 240/1 EL; 350/112; 324/154; 353/14

[56] References Cited

UNITED STATES PATENTS

| | | | |
|---|---|---|---|
| 1,088,897 | 3/1914 | Gyr | 350/112 X |
| 1,856,411 | 5/1932 | Carroll | 177/178 X |
| 2,437,306 | 3/1948 | Ramsay | 116/124.1 |
| 2,539,654 | 1/1951 | Barnes | 40/137 |
| 2,664,848 | 1/1954 | Nauth | 116/124.4 |
| 2,782,679 | 2/1957 | Brueder | 353/14 |
| 2,711,711 | 6/1955 | Harman | 116/124.4 |

FOREIGN PATENTS OR APPLICATIONS 775,493 5/1957 Great Britain.......................350/112

*Primary Examiner*—Louis J. Capozi
*Attorney*—Michael S. Striker

[57] ABSTRACT

An indicating instrument wherein a flat block-shaped housing consisting of light diffusing material accommodates a moving-coil instrument having a pivotable pointer whose tip travels along an arcuate path extending lengthwise of the front side of the housing and adjacent to one flat surface of an elongated prism which is pivotable about an axis extending at right angles to and crossing in space with the pivot axis of the pointer. At least the one surface of the prism carries a straight graduated scale and another surface of the prism is mirrored to reflect the images of the scale and of the tip of the pointer toward the front side of the housing. Such images can be observed from several directions in response to appropriate pivotal movement of the prism.

15 Claims, 3 Drawing Figures

INVENTOR.
WILLY KISSELMANN
FRITZ RÜMPELEIN
PAUL KOPF

INDICATING INSTRUMENT WITH PIVOTABLE SCALES

CROSS-REFERENCE TO RELATED APPLICATIONS

The indicating instrument of the present invention constitutes an improvement over and a further development of indicating instruments which are disclosed in the copending applications Ser. Nos. 21,416 filed Mar. 20, 1970 now U. S. Pat. No. 3,637,286 granted Jan. 25, 1972 and 27,267 filed Apr. 10, 1970 of Kisselmann et al., both assigned to the same assignee.

BACKGROUND OF THE INVENTION

The present invention relates to indicating instruments in general, and more particularly to improvements in indicating instruments of the type wherein the position of a pivotable pointer should be determined with reference to one or more elongated scales.

Since the tip of a pivotable pointer by necessity travels along an arcuate path, the scales of presently known indicating instruments wherein the pointer is mounted for pivotal movement are provided with arcuate scales which extend along the arcuate path for the pointer tip. Such scales are not satisfactory in certain types of indicating instruments, i.e., in those instruments where it is desirable to employ an elongated straight scale or several straight scales. For example, a straight scale is often desirable in indicating instruments which are installed in the dashboard of an automotive vehicle.

SUMMARY OF THE INVENTION

An object of the present invention is to provide a novel and improved indicating instrument wherein the positions of a pivotable pointer can be accurately determined with reference to one or more elongated straight scales and wherein the position of the pointer can be read by looking at the front side of the instrument from several angles.

Another object of the invention is to provide a novel and improved indicating arrangement for the position of the pivotable pointer in a moving-coil instrument or the like.

A further object of the invention is to provide a compact, simple and relatively inexpensive indicating instrument of the above outlined character.

An additional object of the invention is to provide an indicating instrument which can be mass-produced to constitute a building block which can be readily connected with a circuit or a like structure whose condition should be determined by reading the position of a pivotable pointer on one or more straight scales.

A concomitant object of the invention is to provide an indicating instrument wherein the position of a pivotable pointer with reference to one or more straight scales can be determined with a high degree of accuracy even though the scale or scales are observed from different angles relative to the exposed side of the instrument.

The indicating instrument of the present invention comprises a housing which preferably consists, at least in part, of light-diffusing material and has a preferably narrow elongated front side, an electric moving-coil instrument or analogous meter means installed in the housing and including a pointer movable about a predetermined axis and having an end portion arranged to travel back and forth along a path adjacent to and extending substantially lengthwise of the front side of the housing, and a light transmitting prism mounted in the housing adjacent to the front side and to the path of movement of the end portion of the pointer. The prism is pivotable about an axis which crosses in space the axis of the pointer and is preferably normal to such axis. A first surface of the prism faces toward and a second surface of the prism faces away from the end portion of the pointer and makes an acute angle with the first surface. At least one of these surfaces is provided with elongated straight scale means which is observable, together with the end portion of the pointer, from the front side of the housing. The two surfaces of the prism meet in the general region of the second pivot axis.

The feature that the prism is pivotable in the housing renders it possible to determine the position of the end portion of the pointer with reference to the scale means with a high degree of accuracy by looking at the front side of the housing from several directions. The scale means preferably includes a main scale on the first surface, and the second surface of the prism is preferably mirrored in such a way that it reflects the images of the main scale and of the end portion of the pointer toward the front side of the housing.

The novel features which are considered as characteristic of the invention are set forth in particular in the appended claims. The improved indicating instrument itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
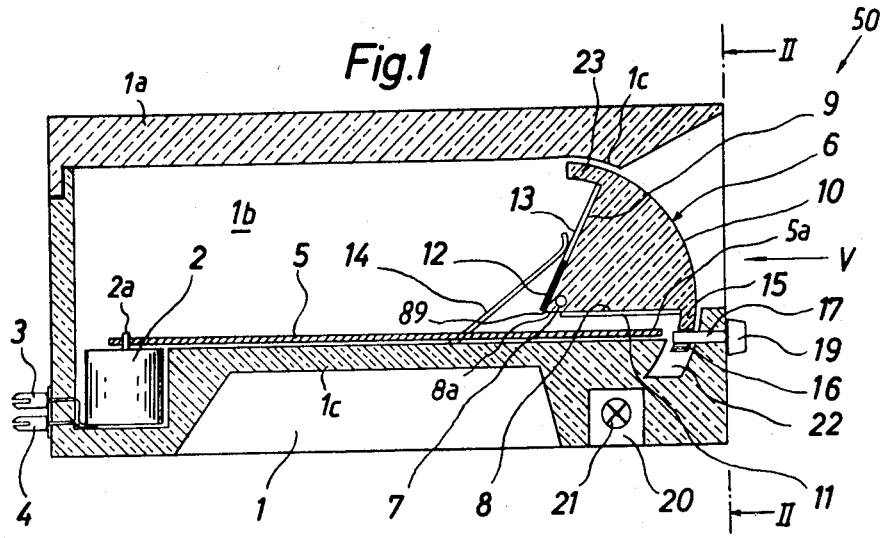
FIG. 1 is a longitudinal sectional view of an indicating instrument which embodies one form of the invention, the section being taken in the direction of arrows as seen from the line I—I of FIG. 2.
Figure 2:
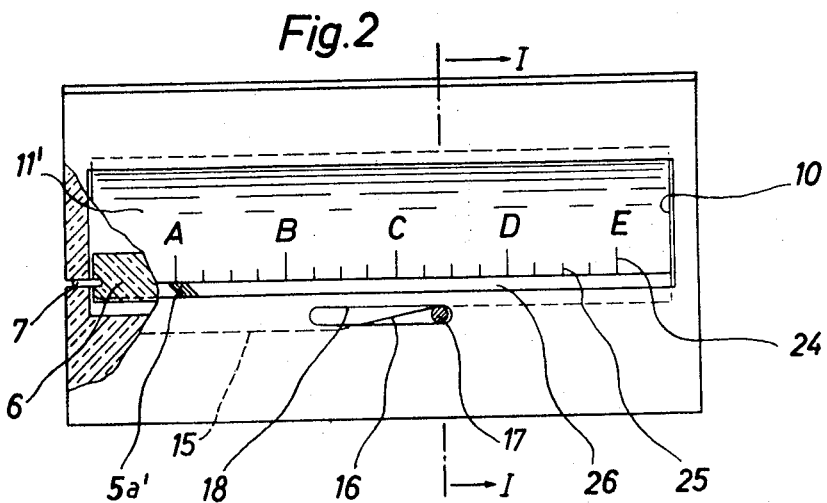
FIG. 2 is a view as seen in the direction of arrows from the line II—II of FIG. 1, with certain components of the instrument partly broken away.

The indicating instrument which is illustrated in FIGS. 1 and 2 comprises a housing preferably consisting of a suitable light diffusing material and including a base portion 1 and a cover portion 1b. The rear portion of the chamber 1b in the housing accommodates an electrical measuring instrument 2 (hereinafter called meter) whose terminals 3, 4 extend from the rear wall of the base 1 and can be coupled to female terminals of an electric circuit, not shown. The meter 2 is of the moving-coil type and its output shaft 2a carries an elongated needle or pointer 5 which is adjacent to the upper side of a platform 1c forming part of the base 1. The housing further accommodates an elongated light transmitting prism 6 which extends along the path of movement of the free end portion or tip 5a of the pointer 5 and is pivotable about the axis of a shaft 7 which is normal to and crosses in space with the shaft 2a of the meter 2. The prism 6 includes a flat first surface 8 which faces the tip 5a of the pointer 5, a flat second surface 9 which faces away from the tip 5a and makes an acute angle with the surface 8, and a convex third surface 10 which faces the front side V of the housing. The surface 10 forms part of a circular cylindrical surface whose center of curvature is on the axis of the shaft 7.

The flat surface 8 carries an elongated straight scale 11 whose width is less than the width of the surface 8 and which is located forwardly of the shaft 7, i.e., to the right of this shaft as viewed in FIG. 1. Thus, the scale 11 does not cover that portion (8a) of the surface 8 which is adjacent to the meeting edge 89 of the surfaces 8 and 9. In the illustrated embodiment, the shaft 7 is located substantially at a level above the rear edge of the scale 11. That portion of the surface 9 which is adjacent to the meeting edge 89 is coated with a liner or mask 12 which constitutes an auxiliary scale and is provided with a row of graduations. The remaining major part 13 of the surface 9 is coated with light-reflecting material so that it constitutes a mirror which reflects the image of the scale 11 toward the front side V of the housing. The chamber 1b further accommodates biasing means here shown as including at least one leaf spring 14 which is mounted in the base 1 and bears against the surface 9 to thus tend to pivot the prism 6 in a clockwise direction, as viewed in FIG. 1. A downwardly projecting extension 15 of the prism 6 is provided at the meeting edge of the surfaces 8 and 10 and is formed with an inclined cam face 16 abutting against an actuating member or wiper 17 which extends through a slot 18 of the base 1 and carries a knob 19 at the front side V of the housing. The spring 14 biases the cam face 16 against the stem of the wiper 17 so that the latter can pivot the prism 6 about the axis of the shaft 7 in response to movement lengthwise of the slot 18. The prism 6 is pivoted counterclockwise, as viewed in FIG. 1, if the wiper 17 is moved to the left, as viewed in FIG. 2. An upwardly projecting second extension 23 of the prism 6 (at the meeting edge of the surfaces 9 and 10) cooperates with a concave internal surface 1d of the cover portion 1a to prevent uncontrolled penetration of light into the chamber 1b.

The bottom surface of the base 1 is provided with an elongated channel 20 which is parallel to the prism 6 and shaft 7 and accommodates illuminating means including one or more light sources 21, preferably pinshaped electric lamps which are connectable to a suitable energy source, not shown. The lamp or lamps 21 are preferably mounted on a carrier, not shown, which can be pushed or otherwise inserted into the channel 20. A recess 22 in the platform 1c of the base 1 serves to accommodate the extension 15 and is deep enough to permit pivotal movement of the prism 6 between two predetermined end positions.

As shown in FIG. 2, the image 11' of the scale 11 on the surface 8 is visible from the front side V of the housing. This scale is provided with equidistant longer or main graduations 24 and with shorter graduations 25. Each of the graduations 24 is identified by a symbol here shown as one of the capital letters A, B, C, D and E. The shorter graduations 25 may but need not be identified by additional symbols, such as numerals or letters a, b, c . . . . Since the scale 11 is narrower than the surface 8, the mirror 13 reflects toward the front side V the image 5a' of that portion of the pointer tip 5a which is adjacent to the portion 8a of the surface 8. The instrument creates the impression of a gap 26 which extends along the lower edge of the image 11' and in which the image 5a' of the tip 5a travels between the two outermost graduations 24 (symbols A and E). FIG. 2 shows the image 5a' of the tip 5a in registry with that graduation 24 which is identified by the symbol A. The gap 26 enables the observer to see the image 5a' of the tip 5a as a short band which travels lengthwise of the scales 11, 12 when the pointer 5 pivots about the axis of the shaft 2a and is readily observable by looking at the surface 10 from several directions.

The purpose of the wiper 17 is to pivot the prism 6 so as to permit observation of the image 11' by looking at the front side V from above, for example, in the direction indicated by arrow 50. This entails such shifting of the wiper 17 that the prism 6 pivots in a counterclockwise direction, as viewed in FIG. 1.

If the observer looks at the front side V in a direction which makes an acute angle with the plane of the scale 11, the eye also sees the images 11' and 5a' as well as the image of the mask or auxiliary scale 12. This is of particular advantage when the main scale 11 is merely provided with graduations or analogous simple indications. As stated above, the auxiliary scale 12 can be provided with graduations which further facilitate the determination of angular position of the pointer 5.

The graduations 24, 25 and symbols A–E may be formed by apertures provided in the main scale 11. The mask 12 prevents reflection on the main scale 11 when the latter is observed in a preferred direction at an acute angle to the surface 8.

Figure 3:
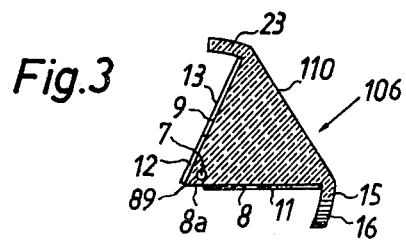
FIG. 3 is a side elevational view of a modified prism which can be utilized in the instrument of FIGS. 1 and 2.

In accordance with a slight modification which is shown in FIG. 3, the prism 6 may be replaced with a prism 106 of triangular cross-sectional outline. Thus, the surface 110 of the prism 106 is also a flat surface. The angle between the surfaces 108,110 of the prism 106 is shown as an acute angle but it can also be a right angle.

The prism 6 or 106 can be mounted at a level above or below the path of movement of the tip 5a.

The housing of the improved indicating instrument preferably resembles a flat block which can be used as a prefabricated building element in radio receivers for use in automotive vehicles or the like. Such flat block-shaped building element occupies little room.

The housing can accommodate additional illuminating means above the prism 6 or 106, or such illuminating means (in the cover portion 1a) can serve as a substitute for the illuminating means 21. The illuminating means is preferably provided with male terminals, similar to terminals 3, 4 of the meter 2, to facilitate connection to an energy source.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. An indicating instrument comprising a housing having a front side; meter means installed in said housing and including a pointer pivotable about a predetermined axis and having an end portion movable along a path adjacent to and extending lengthwise of said front side; and a light-transmitting prism mounted in said housing adjacent to said front side and to said path for pivotal movement about a second axis which crosses in space with said predetermined axis, said prism having a first surface facing said end portion of said pointer and a second surface facing away from said end portion and making an acute angle with said first surface, said surfaces meeting in the region of said second axis, and elongated substantially straight scale means provided on at least one of said surfaces and being observable, together with said end portion of said pointer, from the front side of said housing, said scale means and said end portion of said pointer being observable from said front side of said housing at a plurality of different angles in response to pivoting of said prism about said second axis between a plurality of different angular positions.

2. An instrument as defined in claim 1, wherein said meter means comprises an electrical moving-coil instrument and wherein said surfaces of said prism meet along an edge which is parallel to said second axis and is normal to said predetermined axis.

3. An instrument as defined in claim 1, wherein said prism further comprises a convex third surface facing the front side of said housing.

4. An instrument as defined in claim 1, wherein said prism comprises a third flat surface facing the front side of said housing.

5. An instrument as defined in claim 1, wherein at least a portion of the second surface of said prism is mirrored.

6. An instrument as defined in claim 1, wherein said scale means comprises an elongated scale provided on the second surface of said prism in the region of said second axis.

7. An instrument as defined in claim 1, wherein said scale means includes a main scale on said first surface and an auxiliary scale on said second surface.

8. An instrument as defined in claim 1, wherein said scale means comprises a scale provided on said first surface and extending in parallelism with said second axis.

9. An instrument as defined in claim 8, wherein the width of said scale, as considered at right angles to said second axis, is less than the width of said first surface.

10. An instrument as defined in claim 1, further comprising means for pivoting said prism about said second axis.

11. An instrument as defined in claim 10, wherein said prism comprises an extension adjacent to the front side of said housing and said pivoting means includes actuating means for moving the prism by way of said extension.

12. An instrument as defined in claim 11, wherein said actuating means is arranged to move in substantial parallelism with said second axis.

13. An indicating instrument comprising a housing having a front side; meter means installed in said housing and including a pointer pivotable about a predetermined axis and having an end portion movable along a path adjacent to and extending lengthwise of said front side; a light-transmitting prism mounted in said housing adjacent to said front side and to said path for pivotal movement about a second axis which crosses in space with said predetermined axis, said prism having a first surface facing said end portion of said pointer and a second surface facing away from said end portion and making an acute angle with said first surface, said surfaces meeting in the region of said second axis, elongated substantially straight scale means provided on at least one of said surfaces and being observable, together with said end portion, from the front side of said housing, said prism further comprising an extension adjacent to the front side of said housing and said front side having an elongated slot extending in parallelism with said second axis; and means for pivoting said prism about said second axis, comprising actuating means for moving said prism by way of said extension, said extension having a cam face located behind said slot and said actuating means comprising a wiper extending through said slot and engaging said cam face, said wiper being movable lengthwise of said slot to thereby effect a pivotal movement of said prism by way of said cam face.

14. An instrument as defined in claim 13, wherein said wiper comprises a stem extending outwardly through said slot and a knob provided on said stem adjacent to the front side of said housing.

15. An instrument as defined in claim 13, wherein said pivoting means further comprises means for biasing said cam face against said wiper.

* * * * *